(12) United States Patent
Klug et al.

(10) Patent No.: US 11,592,128 B2
(45) Date of Patent: Feb. 28, 2023

(54) SEALING PROFILE FOR EMBEDDING INTO A MOULDING OF CURABLE MATERIAL

(71) Applicant: Daetwyler Sealing Technologies Deutschland GmbH, Waltershausen (DE)

(72) Inventors: Matthias Klug, Eisenach (DE); Matthias Stender, Gotha (DE)

(73) Assignee: Daetwyler Sealing Technologies Deutschland GmbH, Waltershausen (DE)

( * ) Notice: Subject to any disclaimer, the term of this patent is extended or adjusted under 35 U.S.C. 154(b) by 383 days.

(21) Appl. No.: 16/631,517

(22) PCT Filed: Jul. 16, 2018

(86) PCT No.: PCT/DE2018/200067
§ 371 (c)(1),
(2) Date: Jan. 16, 2020

(87) PCT Pub. No.: WO2019/015730
PCT Pub. Date: Jan. 24, 2019

(65) Prior Publication Data
US 2020/0173586 A1 Jun. 4, 2020

(30) Foreign Application Priority Data
Jul. 18, 2017 (DE) ...................... 10 2017 116 093.0

(51) Int. Cl.
*F16L 21/02* (2006.01)
*E21D 11/38* (2006.01)
(Continued)

(52) U.S. Cl.
CPC ............ *F16L 21/03* (2013.01); *E21D 11/385* (2013.01); *B29K 2709/06* (2013.01);
(Continued)

(58) Field of Classification Search
CPC .. F16L 21/03; F16L 25/0027; B29K 2709/06; B29L 2031/26; E03F 3/04; E21D 11/385;
(Continued)

(56) References Cited

U.S. PATENT DOCUMENTS 4,406,377 A   9/1983 Bruening
4,552,485 A   11/1985 Hammer
(Continued)

FOREIGN PATENT DOCUMENTS

CN   105644108 A   6/2016
DE   2833345 A1    2/1980
(Continued)

OTHER PUBLICATIONS

International Preliminary Report on Patentability dated Jan. 21, 2020, in International Application No. PCT/DE2018/200067.
(Continued)

*Primary Examiner* — Gilbert Y Lee
(74) *Attorney, Agent, or Firm* — Patent Central LLC; Stephan A. Pendorf

(57) ABSTRACT

A sealing profile for embedding into a moulding of curable material, in particular a concrete or plastic moulding, and to a sealing arrangement comprising such a sealing profile. The object of the present invention is to provide a sealing profile for embedding into a moulding of curable material that can be anchored into the moulding in particular such that displacements of the seal in its seat occur to a significantly lesser extent, if at all, when installing or assembling the mouldings. The object is achieved by a sealing profile (1) with a profile region (2) having a profile region surface (4) which is directed towards the moulding (3) after embedding the sealing profile (1), wherein the profile region (2) has, at least in one subregion (6), a non-woven, felted or random fibre layer (5) which is fixedly connected to the sealing (Continued)

Figure 1:
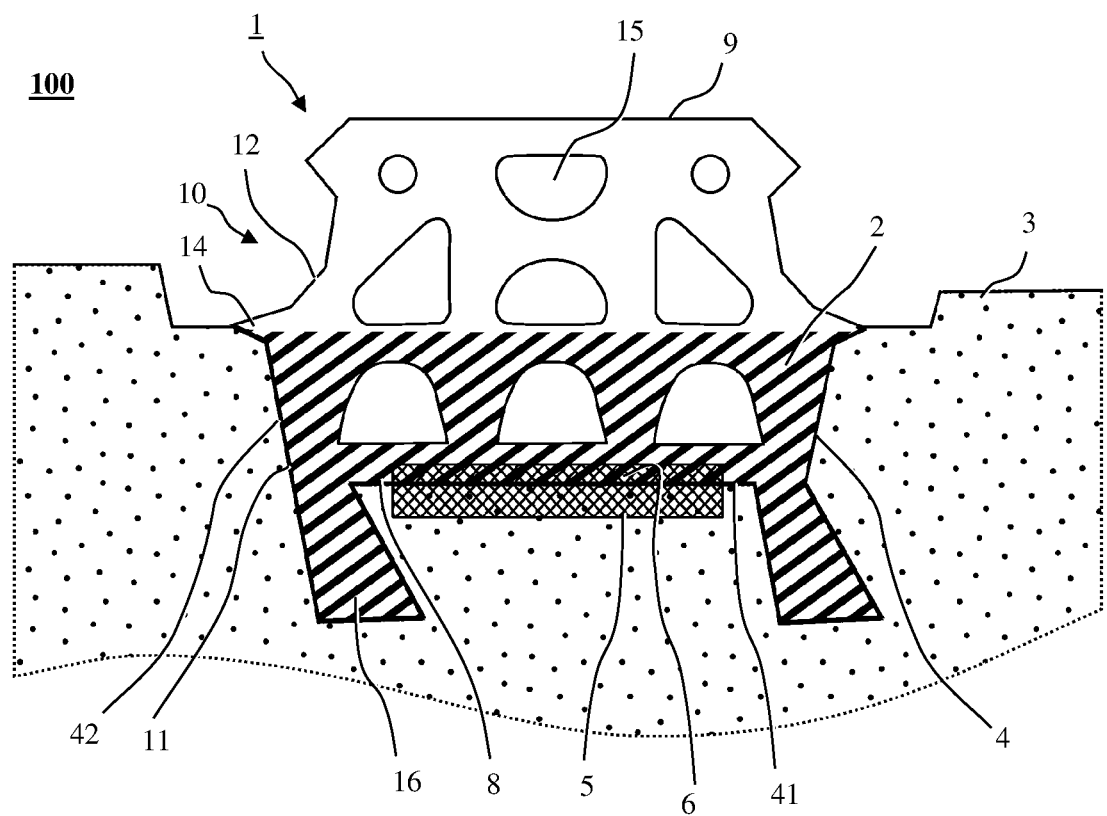

profile (1) and which extend beyond the profile region surface (4).

12 Claims, 4 Drawing Sheets

(51) Int. Cl.
    *F16L 21/03*     (2006.01)
    *B29K 709/06*     (2006.01)
    *B29L 31/26*     (2006.01)
    *E03F 3/04*     (2006.01)
    *E21D 11/08*     (2006.01)
    *F16L 25/00*     (2006.01)

(52) U.S. Cl.
    CPC ............ *B29L 2031/26* (2013.01); *E03F 3/04* (2013.01); *E21D 11/083* (2013.01); *F16L 25/0027* (2013.01)

(58) Field of Classification Search
    CPC . E21D 11/083; F16J 15/02; F16J 15/06; F16J 15/061; F16J 15/062; F16J 15/10; F16J 15/104
    See application file for complete search history.

(56) References Cited

U.S. PATENT DOCUMENTS

| | | | |
|---|---|---|---|
| 5,085,005 A * | 2/1992 | Yasukawa | B60J 10/265 |
| | | | 15/250.1 |
| 5,971,440 A * | 10/1999 | Boatman | F16L 58/185 |
| | | | 285/55 |
| 6,076,834 A | 6/2000 | Jornhagen | |
| 6,237,921 B1 | 5/2001 | Liotta et al. | |
| 9,222,358 B2 | 12/2015 | Hoeft et al. | |
| 2002/0164211 A1 | 11/2002 | Gutschmidt et al. | |
| 2003/0085531 A1 * | 5/2003 | Grabe | E21D 11/385 |
| | | | 277/628 |
| 2012/0121338 A1 * | 5/2012 | Hentschel | E21D 11/388 |
| | | | 405/152 |
| 2013/0059144 A1 * | 3/2013 | Garlich | E01B 9/68 |
| | | | 427/180 |
| 2019/0195070 A1 | 6/2019 | Klug et al. | |

FOREIGN PATENT DOCUMENTS

| | | |
|---|---|---|
| DE | 3142177 A1 | 5/1983 |
| DE | 4218710 C1 | 11/1993 |
| DE | 19841047 C1 | 1/2000 |
| DE | 10111772 A1 | 10/2001 |
| DE | 20121210 U1 | 3/2003 |
| DE | 102007032236 A1 | 1/2009 |
| DE | 102012105398 A1 | 12/2013 |
| EP | 0896173 A2 | 2/1999 |
| EP | 0896175 A2 | 2/1999 |
| RU | 2224155 C2 | 2/2004 |
| RU | 2454581 C2 | 6/2012 |
| WO | 0177440 A1 | 10/2001 |
| WO | 2005088075 A1 | 9/2005 |
| WO | 2017215715 A1 | 12/2017 |

OTHER PUBLICATIONS

Russian Office Action (with English language translation) dated Nov. 26, 2020, in Russian Application No. 2019139503/03(077713).

Chinese Office Action (with English language translation) dated Oct. 22, 2020, in Chinese Application No. 201880041827.3.

International Search Report dated Sep. 21, 2018, in International Application No. PCT/DE2018/200067.

Chinese Office Action (with English language translation) dated Jun. 28, 2021, in Chinese Application No. 2018800418273.

* cited by examiner

SEALING PROFILE FOR EMBEDDING INTO A MOULDING OF CURABLE MATERIAL

The invention relates to a sealing profile for embedding into a moulding of curable material, in particular a concrete or plastic moulding, and to a sealing arrangement comprising such a sealing profile.

Shaft and tunnel structures are regularly composed of individual monolithic prefabricated components (tubbings), between which there are present contact joints, which are sealed with suitable seals, so as, for example, to prevent the penetration of a surrounding medium (e.g. water). The production of such tubbings is usually carried out with the aid of formwork moulds, such as those of known art from DE 4218710 C1, DE 10 2007 032 236 A1, or DE 19841047 C1. A curable material, e.g. concrete, is poured into the formwork mould, which is opened and removed after the material has cured. After the curing of a moulding seals for purposes of sealing the contact joints can be arranged in grooves provided for this purpose in the abutting faces of the prefabricated parts. An example of such a seal is described in DE 2833345 A1. The seals that are required to seal the joints that are later faulted when the prefabricated parts are assembled into a shaft or tunnel, are, however, often already integrated into the prefabricated parts during the casting process, in that they are cast in and anchored at the same time.

Seals provided for embedding into prefabricated parts are usually provided with so-called anchoring feet, which are enclosed by the curable material when a prefabricated part is cast, and are provided so as to hold the seal reliably in the cured prefabricated part. Nevertheless, when the prefabricated parts, e.g. tubbings, are installed, the seal is very often displaced in the prefabricated part. In particular, in the case of seals configured in the form of a frame, as are frequently used in tunnel construction with tunnel tubbings, this can lead, for example, to the deformation of the seal in the regions of the frame corners.

The object of the present invention is to provide a sealing profile for embedding into a moulding made of curable material, which does not have the disadvantages of sealing profiles of known art, in particular which can be anchored in the moulding such that during the installation or assembly of the finished parts there are no, or significantly fewer, displacements of the seal in its seat.

This object is achieved by means of the subject matter of the independent claims. Advantageous configurations of the invention are specified in the dependent claims.

In a first aspect, the present invention provides a sealing profile for embedding into a moulding made of curable material, in particular a concrete or plastic moulding, for example a concrete tubbing or a plastic pipe, wherein the sealing profile has a profile region with a profile region surface, which faces towards the moulding, after embedding of the sealing profile, and wherein the sealing profile has, at least in one subregion of the profile region, a non-woven, felted, or random fibre layer, which is fixedly connected to the sealing profile, and which extends beyond the profile region surface.

It has been found that the displacements of tubbing seals observed in practice can largely be prevented if the sealing profile is anchored in the moulding at least additionally with a non-woven, felted, or random fibre layer, which is fixedly connected to a region of the sealing profile. It is assumed that the displacements of integrated seals observed in practice are due to the fact that the anchoring feet are continuously formed in the longitudinal direction of the profile, in particular in the case of strand-shaped sealing profiles, and cannot completely withstand the action of a force in this direction, so that the result can be displacements and, for example, compressions, of the seal in its seat. The core concept of the present invention is therefore to prevent such displacements and generally to improve the adhesion of the seal to the moulding, in that a layer of non-woven, felted, or random fibres that is fixedly bonded to a profile part of the sealing profile, either instead of, or in addition to, at least one anchoring foot in the moulding, is embedded into the moulding, or is fixedly bonded to the moulding by other means, for example by way of an adhesive layer.

A "tubbing" is understood to mean a prefabricated component of the outer shell of tunnels, shafts, pipes, etc. It can, for example, take the form of an annular segment, or a full annular component, e.g. made of concrete.

A "curable material" is here understood to mean a material that is at first able to flow, but which under normal conditions cures of its own accord, or under an external influence, e.g. heat, UV light, etc. It can take the form of concrete, synthetic resin, adhesive and the like. It can, for example, also be a synthetic resin containing fibres, which cures to a fibre-reinforced plastic, such as GFRP.

A "sealing profile" is here understood to mean a preferably strand-shaped and/or annular elastomer profile with a sealing function, for example a tubbing seal, a concrete or plastic pipe seal, or a shaft seal. An "elastomer profile" is a profile made from an elastomeric material. Examples of suitable elastomeric materials are natural rubber (NR), styrene-butadiene rubber (SBR), butyl rubber (IIR), ethylene-propylene rubber (EPDM), butadiene-acrylonitrile rubber (NBR), hydrogenated acrylonitrile rubber (HNBR), chloroprene rubber (CR), chlorosulphonated polyethylene (CSM), polyacrylate rubber (ACM), polyurethane rubber (PU), silicone rubber (Q), fluorosilicone rubber (MFQ) and fluororubber (FPM). EPDM, SBR, CR or NBR are preferred, in particular NBR, wherein the elastomer material preferably has a Shore hardness of 60-80°. Compounds of elastomers, such as those mentioned above, are also possible. A sealing profile can also consist of different elastomer materials in certain regions. For example, the back section of a tubbing profile, i.e. the profile region with which the profile is inserted into a formwork mould, can consist of a different elastomer material, for example a harder elastomer material, than that of the base of the profile, or vice versa. Profiles with regions made of different elastomeric materials can be produced, for example, by coextrusion.

The term "integrated seal" is here understood to mean a sealing profile that is intended for embedding into a moulding made of curable material, and is configured accordingly, e.g. is fitted with at least one anchoring foot or other devices for embedding the sealing profile into the curable material.

An "anchoring foot" is here understood to mean a profile extension that projects into the later moulding and produces a positive form fit between the profile and the moulding, such that the profile is attached on or in the cured moulding such that it cannot be removed without damaging the moulding and/or the profile (e.g. by tearing off the profile extension). For this purpose, the profile extensions can, for example, be dovetail-shaped or can generally be configured with a cross-section increasing towards the end of the extension. An anchoring foot can alternatively, or additionally, also be provided with barbed hooks, undercuts and the like.

The term "profile base" is here understood to mean the part of the sealing profile which, after it has been anchored, is oriented towards the moulding, and on which the at least one anchoring foot may be located. The term "profile back" refers to the part of the sealing profile that is essentially located opposite the profile base, and which provides the sealing surface in the finished moulding. In the case of tubbings for tunnel construction, for example, this sealing surface abuts against the profile back of a sealing profile in an adjacent moulding. The term "profile flank" refers to the lateral regions of the sealing profile between the profile base and the profile back. The term "back-side flank part" refers to that part of a profile flank that is closer to the profile back, while the term "base-side flank part" refers to that part of a profile flank, which is closer to the profile base.

The term "layer of non-woven, felted, or random fibres" is understood to mean a layer of fibres that are joined together to form a layer of non-woven, felted, or random fibres, and are connected together in a suitable manner, for example by a positive form fit (e.g. entanglement), and/or frictional engagement, and/or by material bonding, for example by means of binders and/or thermal processes (e.g. fusion, welding). Because the fibres of a non-woven, felted, or random fibre layer are connected together, they also withstand a transverse loading or a transverse elongation.

The formulation, according to which the sealing profile has a "non-woven, felted, or random fibre layer extending beyond the profile region surface", is to be understood to mean that the fibres of the non-woven, felted, or random fibre layer protrude beyond the profile region surface in the direction of the future moulding, that is to say, extend from a region of the sealing profile, or an adhesive layer applied thereto, in the direction of the (future) moulding. The fibres of the non-woven, felted, or random fibre layer can have any orientation.

When it is stated here that the non-woven, felted, or random fibre layer is provided in a subregion of the profile region, this also includes the possibility that the non-woven, felted, or random fibre layer can be provided in two or more non-contiguous regions of the profile region. The subregion with the non-woven, felted, or random fibre layer can therefore also be discontinuous.

The non-woven, felted, or random fibre layer is preferably arranged in at least a region of the sealing profile which, after embedding, is brought into contact with the moulding, possibly indirectly by way of an adhesive layer.

As already stated, the inventive sealing profile can also be anchored in the moulding solely by way of the non-woven, felted, or random fibre layer. Thus it is not absolutely necessary to provide one or a plurality of anchoring feet. In this embodiment, the sealing profile is connected to the moulding solely by the non-woven, felted, or random fibre layer. This is, for example, preferred in the case of an annular seal for plastic pipes or pipe couplings that are anchored in the pipe wall or coupling wall by means of the non-woven, felted, or random fibre layer. In one embodiment of the invention, however, the sealing profile has in the profile region at least one anchoring foot, for purposes of anchoring the sealing profile in the moulding, which is later oriented towards the moulding. In this form of embodiment, which may be preferred in particular for extruded forms of sealing profiles, such as those frequently used for tunnel tubbings, the non-woven, felted, or random fibre layer, in addition to the at least one, usually continuously formed, anchoring foot, serves to provide additional anchoring of the sealing profile in the moulding so as to prevent or reduce, in particular, displacements of the sealing profile in the longitudinal plane of the profile.

In the event that the inventive sealing profile, in the profile region, which is later oriented towards the moulding, has two or more anchoring feet spaced apart from one another, for example anchoring feet arranged laterally from the profile longitudinal axis, the non-woven, felted, or random fibre layer is preferably arranged in the profile region between the anchoring feet. If there are more than two anchoring feet present, it is preferable to provide a non-woven, felted, or random fibre layer between all adjacent anchoring feet. However, this is not necessary in every case, i.e. in the case of three anchoring feet, for example, a non-woven, felted, or random fibre layer can also be provided between just two adjacent anchoring feet.

The non-woven, felted, or random fibre layer can be fixedly connected, either directly or indirectly, to the profile region. A direct connection can be achieved, for example, by embedding the non-woven, felted, or random fibre layer into the profile region with a surface facing towards the sealing profile. This can be done, for example, during the production of the profile by partially vulcanising the non-woven, felted, or random fibre layer, in that fibres or parts of fibres are vulcanised in the region, or also below the surface, of the non-woven, felted, or random fibre layer. An indirect connection can be produced by means of an adhesive layer on the profile region into which the non-woven, felted, or random fibre layer is embedded, with a surface facing towards the profile. The fibres of the non-woven, felted, or random fibre layer can be made, for example, of metal, glass, cotton or plastic, for example of a polyamide, polyester or aramid. The material composition and layer thickness of the non-woven, felted, or random fibre layer can be selected and/or adapted by a person skilled in the art, depending on the respective purpose, and taking into account the forces to be anticipated and absorbed.

The sealing profile preferably consists of an elastomeric material, preferably EPDM, SBR, CR or NBR, preferably NBR, wherein the elastomeric material preferably has a Shore hardness of 60-80°.

In an embodiment of the invention that is particularly suitable for tunnel tubbings, the profile region comprises a profile base with, after embedding of the sealing profile, a profile base surface facing towards the moulding, and at least one profile flank with a base-side flank part with, after embedding of the sealing profile, a flank part surface facing towards the moulding, wherein the profile base has, at least in a subregion, a non-woven, felted, or random fibre layer, which is fixedly connected to it, and extends beyond the profile base surface, and/or the base-side flank part has, at least in one subregion, a non-woven, felted, or random fibre layer, which is fixedly connected to the base-side flank part and extends beyond the flank part surface. Such sealing profiles often have one, two or a plurality of anchoring feet for purposes of anchoring the sealing profile in the moulding. In this case it is preferable to arrange a non-woven, felted, or random fibre layer between at least two of the anchoring feet.

In a second aspect, the present invention also concerns a sealing arrangement comprising a moulding of curable material, in particular a concrete or plastic moulding, and an inventive sealing profile embedded therein in accordance with the first aspect of the invention, wherein the non-woven, felted, or random fibre layer on the one side is fixedly connected to the sealing profile, and on the other side is fixedly connected to the moulding. "On the one side fixedly connected to the sealing profile, and on the other side fixedly connected to the moulding" means that the non-woven, felted, or random fibre layer, with fibres or fibre regions located towards the surface facing the profile of the non-woven, felted, or random fibre layer, is fixedly connected to a region of the sealing profile, be it by means of an adhesive layer on the profile region surface, in which fibres or fibre regions are embedded, or by means of direct embedding of the fibres or fibre regions in the matrix of the profile region, e.g. the profile base, itself, and with fibres or fibre regions located towards the surface of the non-woven, felted, or random fibre layer facing in the opposite direction to the moulding, are embedded in the moulding, i.e. are surrounded by the cured material of the moulding.

In the inventive sealing arrangement, an inventive sealing profile is anchored in the moulding by way of a multiplicity of punctiform connections formed by the embedded fibres or fibre regions of the non-woven, felted, or random fibre layer. One of the advantages of a connection between the moulding and the sealing profile by way of a layer of non-woven, felted, or random fibres, compared to a layer of flock fibres, for example, is that, in the case of a non-woven, felted, or random fibre layer, not every individual fibre is connected directly with one end to the sealing profile and with the other end to the moulding, but rather that on the one side fibres are connected to the sealing profile and on the other side fibres are connected to the moulding, wherein the fibres connected to the sealing profile and the fibres connected to the moulding are connected to one another by way of fibres. As a result, a seal anchored in accordance with the invention by means of a non-woven, felted, or random fibre layer is also more resistant to transverse loads or strains. The sealing profile can either be anchored in the moulding only by way of the non-woven, felted, or random fibre layer, or in addition with one or a plurality of anchoring feet.

The layer thickness of the non-woven, felted, or random fibre layer can be selected by the person skilled in the art depending on the requirements. Here it is preferable for the non-woven, felted, or random fibre layer to be completely embedded in the material of the sealing profile or adhesive layer on the one side, and in the material of the moulding on the other side.

The moulding can be, for example, a concrete tubbing for tunnel construction, a concrete ring for a shaft or a concrete pipe (section), e.g. for sewer or pipeline construction, or a plastic pipe, for example a GRP pipe.

In what follows the invention is explained in more detail, with the aid of the appended figures, purely for illustrative purposes.

FIG. 1 shows a schematic illustration of a form of embodiment of an inventive sealing profile, embedded in a moulding.

Figure 2:
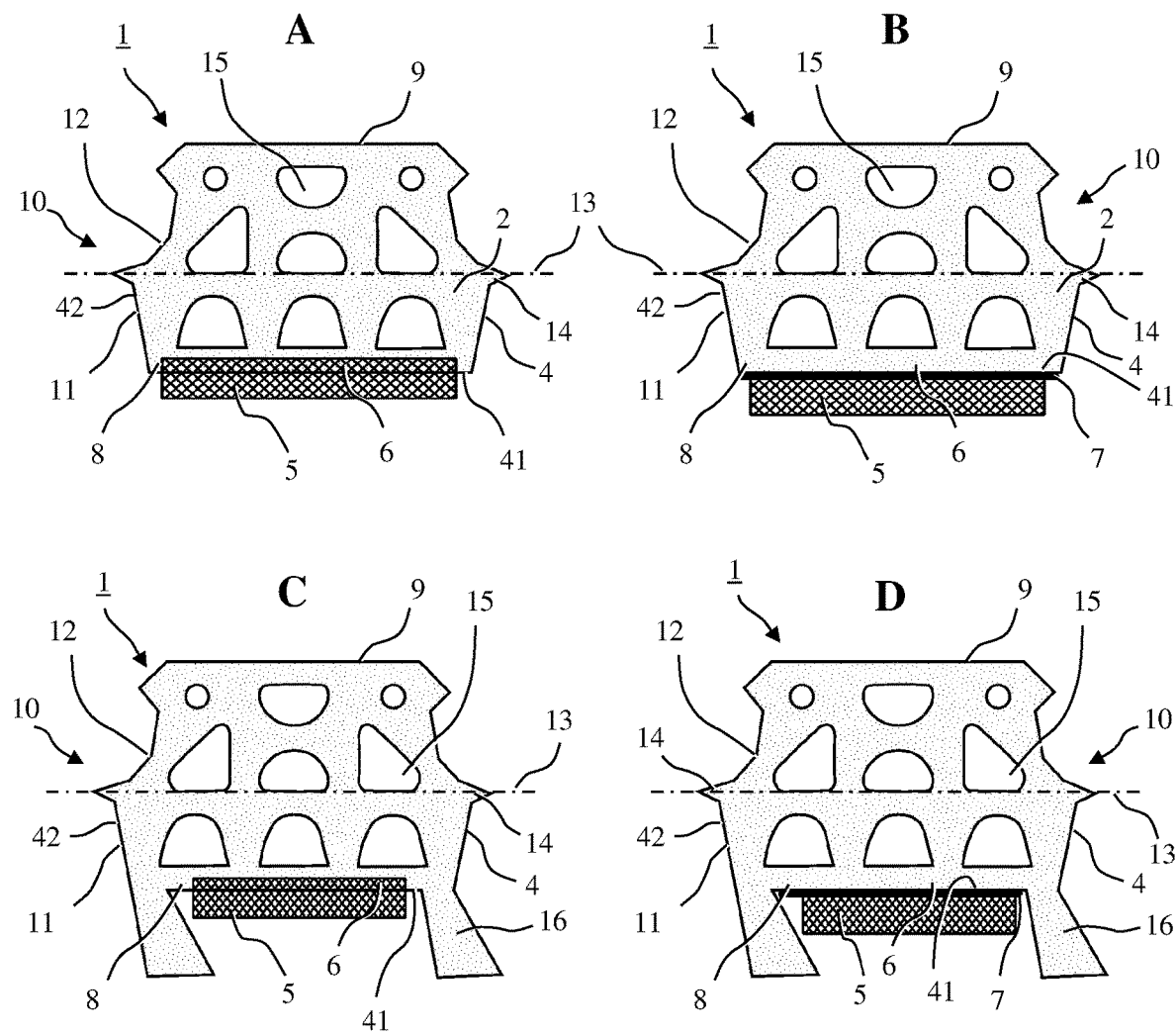

FIG. 2 shows a schematic illustration of embodiments of an inventive sealing profile in cross-section. A: an embodiment without an anchoring foot with a vulcanised non-woven, felted, or random fibre layer. B: an embodiment without an anchoring foot, with a non-woven, felted, or random fibre layer, which is bonded to the profile base by way of an adhesive layer. C: an embodiment with an anchoring foot with a vulcanised non-woven, felted, or random fibre layer. D: an embodiment with an anchoring foot, with a non-woven, felted, or random fibre layer, which is bonded to the profile base by way of an adhesive layer.

Figure 3:
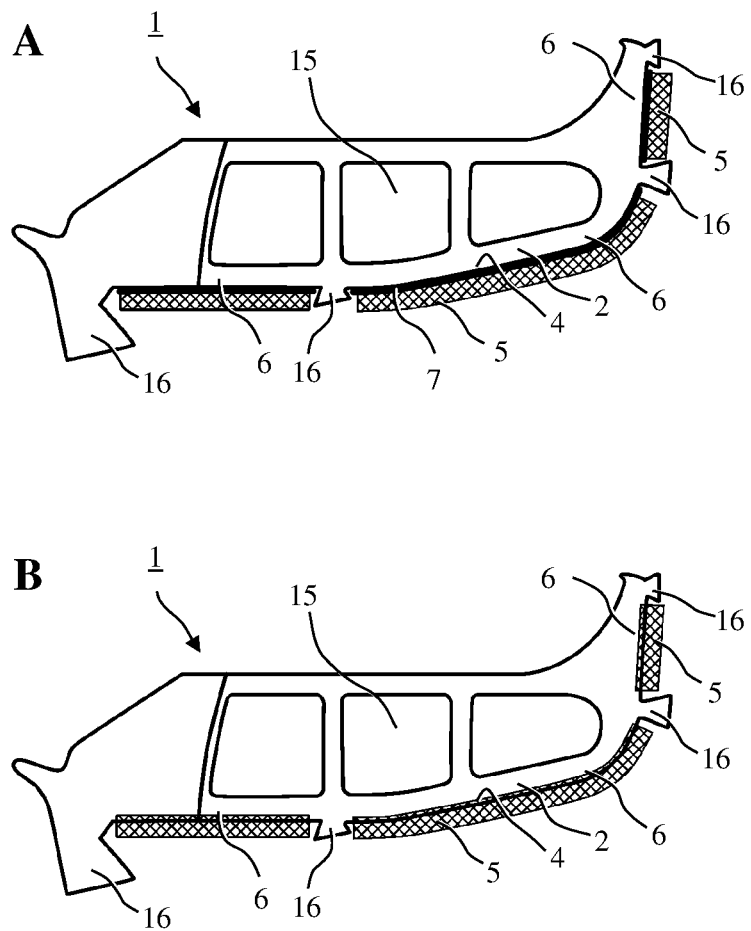

FIG. 3 shows schematically an embodiment of an inventive sealing profile for concrete pipes or shafts. A: an embodiment with anchoring feet, with a non-woven, felted, or random fibre layer, which is bonded to the profile by way of an adhesive layer. B: an embodiment with anchoring feet, with a non-woven, felted, or random fibre layer, which is embedded directly in the profile.

Figure 4:
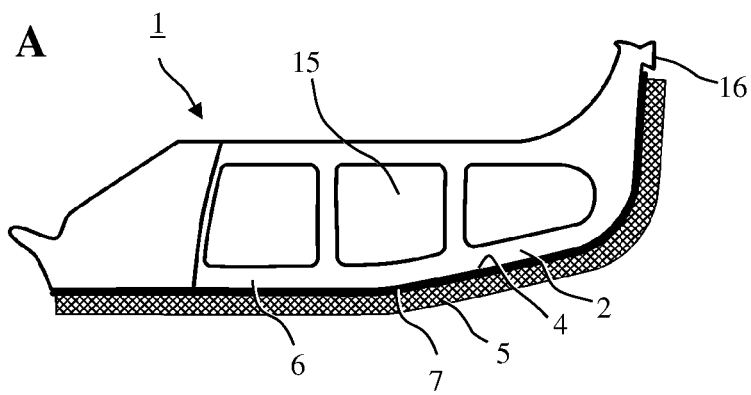
Figure 4:
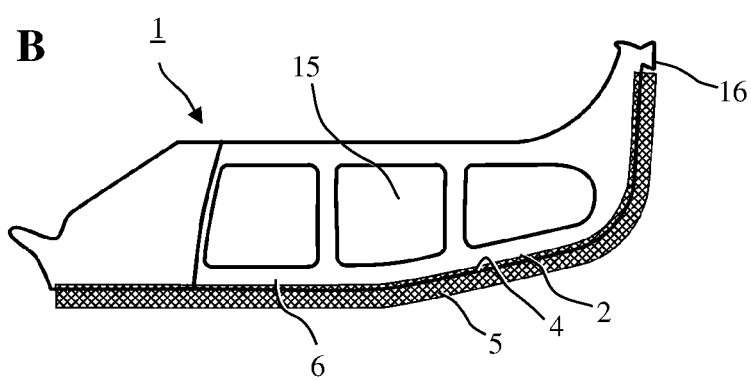

FIG. 4 shows schematically a further embodiment of an inventive sealing profile for concrete pipes or shafts. A: embodiment with a non-woven, felted, or random fibre layer, which is bonded to the profile by means of an adhesive layer. B: embodiment with a non-woven, felted, or random fibre layer, which is embedded directly in the profile.

FIG. 1 shows schematically a sealing arrangement 100, comprising a sealing profile 1, as is also illustrated in FIG. 2C, and a moulding 3, here a concrete tubbing for tunnel construction, of which only a detail is shown.

The sealing profile 1 of elastomeric material, here generally hexagonal in cross-section, has a profile region 2 (here shown hatched) with a profile region surface 4 facing towards the moulding 3. The profile region 2 comprises a profile base 8 with a profile base surface 41 and base-side profile flank parts 11 of the lateral profile flanks 10 with a profile flank surface 42. The sealing profile 1 has a profile back 9 located opposite to the profile base 8 and back-side flank parts 12. A non-woven, felted, or random fibre layer 5, which here is designed as a strip-shaped mat, is here, with fibres or fibre regions which lie in the region of their surface facing towards the sealing profile 1, embedded directly in the sealing profile 1, i.e. in a subregion 6 of the profile region 2, here the profile base 8. In this embodiment, here fitted with two dovetail-shaped anchoring feet 16, spaced apart from one another, the subregion 6 with the non-woven, felted, or random fibre layer 5 lies in the region of the profile base 8 between the anchoring feet 16. The strip-shaped sealing profile 1 has longitudinal channels 15 running in the longitudinal direction of the sealing profile 1, as is also of known art for profiles of the prior art.

In the sealing profile 1 shown here flank-side sealing lips 14 are present; these are arranged in each case at the height of the plane 13 (see FIG. 2), above which in the illustration the back-side flank parts 12 are located, and below which the base-side flank parts 11 are located. The sealing profile 1 is surrounded on the base side and up to the sealing lips 14 by the curable material, for example concrete. In embodiment shown here, the sealing profile 1 is anchored, both by way of the anchoring feet 16, and also by way of the non-woven, felted, or random fibre layer 5. The non-woven, felted, or random fibre layer 5 prevents or renders difficult any displacement of the sealing profile 1 in its longitudinal direction, i.e. in the direction at right angles to the plane of the paper, by virtue of its connection to the moulding 3.

FIG. 2 shows schematically various embodiments of an inventive sealing profile 1 in cross-section. FIG. 2A shows an embodiment of an inventive sealing profile 1 without an anchoring foot 16, with a non-woven, felted, or random fibre layer vulcanised directly into the profile base 8. FIG. 2B shows an embodiment of an inventive sealing profile 1 without an anchoring foot 16, with a non-woven, felted, or random fibre layer 5 connected to the profile base 8 by way of an adhesive layer 7. FIG. 2C shows the embodiment of an inventive sealing profile 1 shown in FIG. 1, embedded in a moulding 3, with two anchoring feet 16, and with a layer of non-woven fabric, felted, or random fibres vulcanised into the moulding. FIG. 2D shows an embodiment of an inventive sealing profile 1 with anchoring feet 16, and with a layer of non-woven fabric, felted, or random fibres 5, which is connected to the profile base 8 by way of an adhesive layer 7. In each case cross-sections through a strand-shaped sealing profile 1 are represented, i.e. sections transverse to the longitudinal axis of the strand-shaped sealing profile 1, which must be thought of as continuing above and below the plane of the paper.

The embodiments shown in FIGS. 2A and 2B do not have any anchoring feet 16. The embodiments shown in FIGS. 2C and 2D have two anchoring feet 16, extending from the profile base 8, here dovetail-shaped and spaced apart from one another. A non-woven, felted, or random fibre layer 5 is embedded, with fibres or fibre regions, which lie in the region of the surface facing the sealing profile, either directly in the profile base 8 (FIGS. 2A, 2C) or in an adhesive layer 7 (FIGS. 2B, 2D) on the profile base surface 41. In embodiments with anchoring feet 16 (FIGS. 2C, 2D), the non-woven, felted, or random fibre layer 5 is arranged in the region of the profile base 8 between the anchoring feet 16. The sealing profiles 1 have longitudinal channels 15 running in the longitudinal direction of the sealing profile 1, as is also of known art for profiles of the prior art.

FIG. 3 shows a cross-section through an embodiment of an inventive sealing profile 1, which is particularly suitable for concrete pipes or shafts. Here the sealing profile 1 has anchoring feet 16 and a non-woven, felted, or random fibre layer 5, with the aid of which the sealing profile 1 can be embedded in a concrete pipe sleeve (not shown). The non-woven, felted, or random fibre layer 5 is either bonded to the profile region 2 by means of an adhesive layer 7 on the profile region surface 4, which is oriented towards the later moulding 3, i.e. the concrete pipe sleeve (see FIG. 3A), or is embedded directly in the profile region 2 (see FIG. 3B). The non-woven, felted, or random fibre layer 5 is arranged in subregions 6 of profile region 2 between the anchoring feet 16. Here, too, there are longitudinal channels 15 in the sealing profile 1.

FIG. 4 shows a cross-section through another embodiment of an inventive sealing profile 1, which is particularly suitable for concrete pipes or shafts. Here it is essentially the non-woven, felted, or random fibre layer 5, which is provided beyond an extended subregion 6, that serves to anchor the sealing profile 1. The single anchoring foot 16 still present in the edge region of the sealing profile 1 essentially serves as a protection against liquid concrete when casting the moulding 3. In this form of embodiment also, the non-woven, felted, or random fibre layer 5 is either bonded to the profile region 2 by means of an adhesive layer 7 on the profile region surface 4, which is oriented towards the later moulding 3, i.e. the concrete pipe sleeve (see FIG. 4A), or is embedded directly in the profile region 2 (see FIG. 4B).

The invention claimed is:

1. A sealing arrangement, comprising
a moulding (3) of a curable material, and
a sealing profile (1),
wherein the sealing profile (1) has a profile region (2) embedded in the moulding (3) with a profile region surface (4) facing towards the moulding (3),
wherein the sealing profile (1) has, at least in a subregion (6) of the profile region (2), a non-woven, felted, or random fibre layer (5) extending beyond the profile region surface (4), with a first side surface of the layer (5) facing the region surface (4) and a second side surface of the layer (5) facing towards the moulding (3),
wherein fibers or fiber regions of the fibre layer (5) located towards the first side surface of the fibre layer (5) are fixedly connected to the sealing profile (1) indirectly by means of an adhesive layer (7) on the profile region surface (4) of the profile region (2) or directly by embedding in the profile region (2),
wherein fibers or fiber regions of the fibre layer (5) located towards the second side surface of the fibre layer (5) are fixedly connected to the moulding (3) directly by embedding in the moulding (3),
and wherein fibres fixedly connected to the sealing profile (1) and fibres fixedly connected to the moulding (3) are connected to each other by way of intermediate fibres.

2. The sealing arrangement according to claim 1, wherein the sealing profile (1) has at least one anchoring foot (16) in the profile region (2) for purposes of anchoring the sealing profile (1) in the moulding (3).

3. The sealing arrangement according to claim 1, wherein the sealing profile (1) has two or more anchoring feet (16) in the profile region (2), spaced apart from one another, and one or more subregions (6) with a non-woven, felted, or random fibre layer (5), in each case between two adjacent anchoring feet (16).

4. The sealing arrangement according to claim 1, wherein the sealing profile (1) consists of an elastomeric material, and wherein the elastomeric material has a Shore hardness of 60-80.

5. The sealing arrangement according to claim 4, wherein the sealing profile (1) consists of an elastomeric material selected from the group consisting of EPDM, SBR, CR, and NBR.

6. The sealing arrangement according to claim 4, wherein the sealing profile (1) consists of an elastomeric material comprising NBR.

7. The sealing arrangement according to claim 1, wherein the fibres of the non-woven, felted, or random fibre layer (5) are metal, glass, cotton or plastic fibres.

8. The sealing arrangement according to claim 7, wherein the fibres of the non-woven, felted, or random fibre layer (5) are polyamide, polyester or aramid fibres.

9. The sealing arrangement according to claim 1, wherein the moulding (3) is a concrete or plastic moulding.

10. The sealing arrangement according to claim 1, wherein the curable material is a concrete or plastic moulding.

11. The sealing arrangement according to claim 1, wherein the moulding (3) is a concrete tubbing for tunnel construction, a concrete ring for shaft construction, a concrete pipe for sewer or pipeline construction, or a plastic pipe.

12. The sealing arrangement according to claim 1, wherein the moulding (3) is a GRP pipe.

* * * * *